United States Patent
Cigarini

(10) Patent No.: US 8,925,206 B2
(45) Date of Patent: Jan. 6, 2015

(54) CUTTING ELEMENT FOR A HEDGE TRIMMER

(75) Inventor: Enrico Cigarini, Reggio Emilia (IT)

(73) Assignee: Tecomec S.r.l., Reggio Emilia (IT)

( * ) Notice: Subject to any disclaimer, the term of this patent is extended or adjusted under 35 U.S.C. 154(b) by 323 days.

(21) Appl. No.: 13/281,839

(22) Filed: Oct. 26, 2011

(65) Prior Publication Data

US 2012/0102762 A1  May 3, 2012

(30) Foreign Application Priority Data

Oct. 27, 2010 (IT) .............................. MO2010A0299

(51) Int. Cl.
- *A01D 34/416* (2006.01)
- *A01D 34/73* (2006.01)
- *A01G 3/053* (2006.01)

(52) U.S. Cl.
CPC .............. *A01D 34/733* (2013.01); *A01G 3/053* (2013.01)
USPC ............................................ 30/276; 56/12.7

(58) Field of Classification Search
CPC .............. A01D 34/412; A01D 34/416; A01D 34/4165; A01D 34/4166; A01D 34/4168
USPC ..................... 30/276, 347; 56/12.7
See application file for complete search history.

(56) References Cited

U.S. PATENT DOCUMENTS

| | | | | |
|---|---|---|---|---|
| 1,905,764 A | * | 4/1933 | Testi | 30/68 |
| 2,618,684 A | * | 11/1952 | Bergan | 174/87 |
| 2,872,505 A | * | 2/1959 | Ustin | 174/87 |
| 4,378,668 A | | 4/1983 | Gullett | |
| RE36,940 E | | 11/2000 | Fogle | |
| 2006/0112568 A1 | * | 6/2006 | Jerez | 30/276 |
| 2008/0010836 A1 | | 1/2008 | Iacona | |

FOREIGN PATENT DOCUMENTS

| | | |
|---|---|---|
| EP | 0 132 385 A1 | 1/1985 |
| GB | 1 223 042 A | 2/1971 |

* cited by examiner

*Primary Examiner* — Phong Nguyen
(74) *Attorney, Agent, or Firm* — Pearne & Gordon LLP

(57) ABSTRACT

A cutting element for a hedge trimmer, comprising: a cutting portion (2); an attaching portion (3), associated to the cutting portion (2) and predisposed to enable attachment of the cutting element to a rotating head (10) of a hedge-trimmer; the attaching portion (3) is hook-shaped and comprises an eyelet (31) on which a housing seating (32) is afforded for an attaching pin (12) solidly constrained to the rotating head (10), the housing seating (32) is provided with an opening (33) a maximum width of which is smaller than a diameter of the attaching pin (12); elastic means are predisposed to enable the opening (33) of the housing seating (32) to broaden up to taking on a width which is at least equal to the diameter of the attaching pin (12).

11 Claims, 2 Drawing Sheets

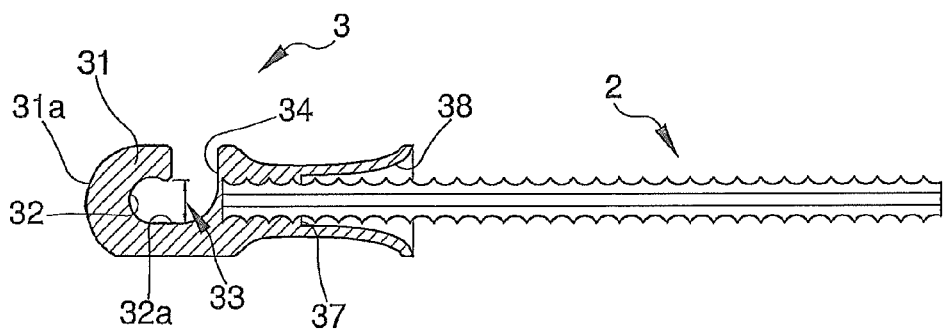
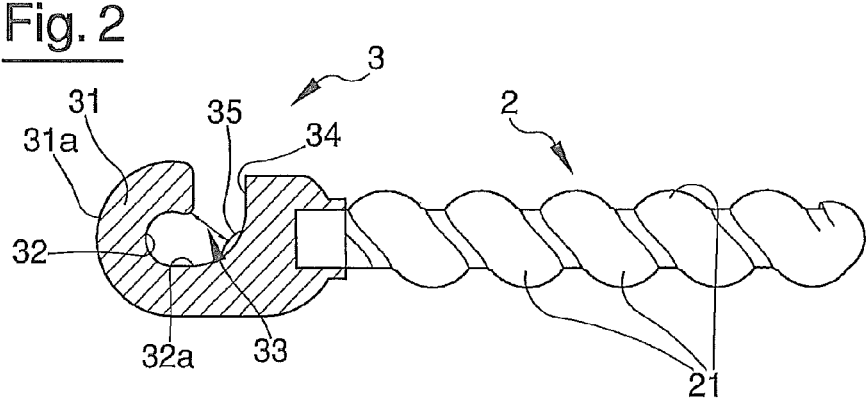
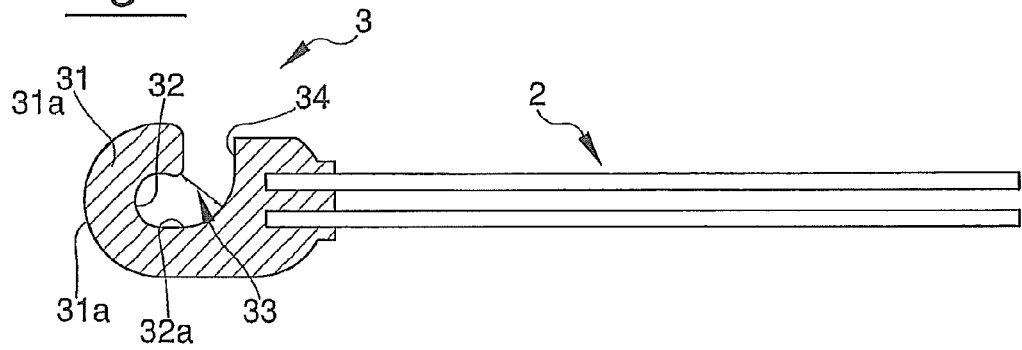

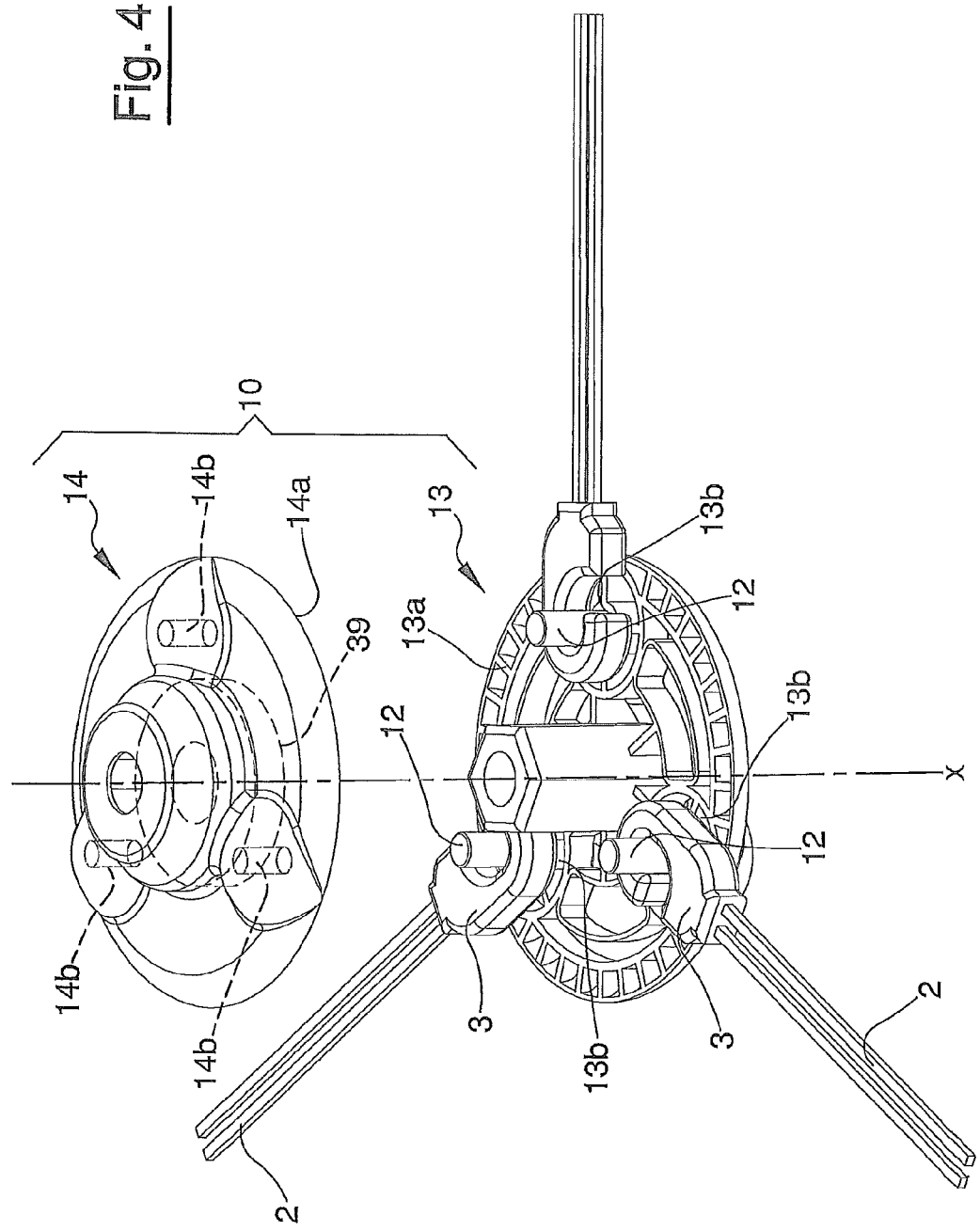

CUTTING ELEMENT FOR A HEDGE TRIMMER

The invention relates to a cutting element for a hedge trimmer.

A hedge trimmer normally comprises a rotating head, activated to rotate about a main axis, to which are associated one or more cutting elements. The cutting elements, at least during the rotation of the head of the hedge trimmer, project radially from the rotating head and cut the leaves of grass or other vegetation with which they come into contact.

The cutting elements of a presently-used type on the market comprise in general a cutting portion to which an attaching portion is associated. This attaching portion is predisposed to enable attachment of the cutting element to an attaching pin solidly constrained to the rotating head of the hedge trimmer.

In the cutting elements of known type, the attaching portion is generally in the form of a ring or other shape which, in order to enable mounting on the attaching pin, requires the removal and/or displacement of at least a part of the rotating head. This represents a drawback, as often the removal of the parts necessary for enabling mounting of the cutting elements is relatively laborious. Further, there could be risks that the following repositioning of the removed parts is imprecise, with the consequent risk that during the rotating of the head the parts are dangerously projected in the radial direction.

The aim of the present invention is to provide a cutting element for hedge trimmers which enables the above-described drawbacks of known-type hedge trimmers to be obviated.

Characteristics and advantages of the present invention will more fully emerge from the following description, given by way of non-limiting example, of a preferred though not exclusive embodiment of a cutting element for hedge trimmers, as illustrated in the accompanying figures, in which:

FIG. 1 illustrates a first embodiment of a cutting element of the present invention;

FIG. 2 is a second embodiment of a cutting element of the present invention;

FIG. 3 is a third embodiment of a cutting element of the present invention;

FIG. 4 shows the rotating head of a hedge trimmer according to the present invention.

With reference to the figures, the cutting element for hedge trimmers of the present invention comprises a cutting portion 2 to which an attaching portion 3 is associated, predisposed to enable attachment of the cutting element to a rotating head 10 of a hedge trimmer.

In a typical embodiment, the rotating head of a hedge trimmer comprises a support body 13, 14, predisposed to be activated in rotation about a main axis X. For this purpose, the support body 13,14 is provided with a profiled seating for sliding coupling to a motorised rotating shaft, not illustrated in the figures. At least an attaching pin 12, located with a longitudinal axis thereof parallel to the main axis X, is solidly constrained to the support body 13, 14. The rotating head 10 preferably comprises at least two attaching pins 12, arranged in diametrically opposite positions with respect to the main axis X. At least a portion of the attachment pins 12 is uncovered and accessible from the side of the rotating head 10. This enables the cutting elements to project radially from the rotating head 10, and enables them to rotate about the attaching pin 12 at least for a certain angle. To this end, the support body is sub-divided into two portions 13, 14 predisposed to be coupled to the one another on a joining plane perpendicular to the main axis X. The two portions 13, 14 are shaped such that when coupled to one another the respective peripheral zones 13a, 14a are flanked to one another and distanced by a certain amount.

Housing holes 13b, 14b are afforded on the peripheral zones 13a,14a facing the portions 13, 14 and are aligned in pairs such as to house the ends of the attaching pins 12, such that at least the central portions of the attaching pins 12 which project from the housing holes afforded on the peripheral zones 13a, 14a of the portions 13, 14 are uncovered and accessible from the flank of the rotating head 10.

The attaching portion 3 is shaped as a hook and comprises an eyelet 31 on which a housing seating 32 for an attaching pin 12 is afforded, the pin 12 being solidly constrained to the rotating head 10. The housing seating 32 is provided with an opening 33 the maximum width of which is smaller than the diameter of the attaching pin 12. Elastic means are predisposed to enable the opening 33 to widen at least up to the diameter of the attaching pin 12. The elastic means can be constituted by the elasticity of the eyelet 31 which, on application of a sufficient force, can deform elastically and enable a widening of the opening 33 of the housing seating 32. Alternatively the elastic means can be defined by an elastic element 35, conformed such as to narrow the width of the opening 33 of the housing seating 32 and to be able to deform, on application of a sufficient force, enabling a widening of the opening 33 itself.

In both embodiments of the elastic means, the force for determining the deformation of the elastic means is obtained by forcing the eyelet 31 in contact with the attaching pin 12 in order to insert the pin 12 in the housing seating 32.

In the first embodiment of the elastic means, the eyelet 31 is pressed in contact with the attaching pin 12 at an end edge 32a of the housing seating 32 up until the forced exerted on the end edge causes an elastic deformation of the eyelet 31 which widens the opening 33 of the housing seating 32 and enables insertion of the attaching pin 12. A force exerted in the opposite direction can likewise enable disengagement of the housing seating 32 from the attaching pin 12.

In the second embodiment of the elastic means, the elastic element 35, which projects from a lateral part of the housing seating 32 and is shaped in an arched form with the concavity facing towards the end edge 32a of the housing seating 32, can be compressed in a similar way to the preceding case, by pressing the eyelet 31 in contact with the attaching pin 12. In this case, the attaching pin 12, which is in contact with the end edge 32a and with the elastic element 35, causes the compressing of the elastic element 35 and the following widening of the opening 33 of the housing seating 32, such that the pin 12 can insert internally of the housing seating 32. A force exerted in the opposite direction can enable the disengagement of the housing seating 32 from the attaching pin 12.

To facilitate the insertion and disengagement of the attaching pin 12, the opening 33 of the housing seating 32 is connected to an entry passage 34 which exhibits a maximum width that is greater than the diameter of the attaching pin 12. This entry passage 34 opens on a lateral surface of the attaching portion 3. Preferably the entry passage 34 exhibits a curved development over an arc of about 90°. In this way, to engage the attaching portion 3 on the attaching pin 12 it is sufficient to introduce the attaching pin 12 internally of the entry passage 34 with a transversal movement of the eyelet 31 with respect to the attaching pin 12. Thereafter, the force for determining the engagement of the housing seating 32 on the attaching pin 12 can be obtained by exerting a traction on the eyelet 31 along a direction that is substantially perpendicular with respect to the inserting direction of the attaching pin in the entry passage 34. The shape of the entry passage 34 facilitates the correct directing of the traction force exerted on the eyelet 31 such as to enable insertion of the attaching pin 12 in the housing seating 32. The exerting of the traction force on the eyelet can be facilitated by means of a partial rotation of the eyelet 31, which rotation, in FIGS. 1, 2, 3, is in the clockwise direction. During this partial rotation, the eyelet 31 is pressed such as to engage on the attaching pin 12 by a leverage effect determined by the external edge 31a of the eyelet 31 itself which functions as a fulcrum, being arranged in contact with an annular surface 39, visible in a hidden line in FIG. 4, which projects inferiorly from the upper portion 14 of the support body 13, 14.

The housing seating 32 is shaped such as to enable an idle rotation of the attaching portion 3 about the longitudinal axis of the attaching pin 12. This enables, during the rotation of the head 10 of the hedge trimmer, the cutting portion 2 to be arranged transversally to the main rotation axis X, maintaining the possibility of rotating about the longitudinal axis of the attaching pin 12 thereof in a case of impact against an obstacle. At least partially, the housing portion 32 preferably exhibits a circular development. In the first embodiment of the elastic means, the opening 33 of the housing seating 32 is represented in substance by the minimum-width passage comprised between the end edge 32a and the opposite wall of the housing seating 32. In the second embodiment of the elastic means, the opening 33 of the housing seating 32 is represented in substance by the space comprised between the end edge 32a and the elastic element 35.

In a preferred embodiment, the cutting portion 2 comprises a plurality of rounded lobes 21 which project from opposite sides of the cutting portion 2 itself. Overall, the cutting portion 2 assumes a flattened conformation which, together with the conformation of the rounded lobes 21, though extremely effective in the cutting action, enables easy gripping of the cutting portion 2 in order to exert the necessary forces for the entry of the eyelet 31 and the attaching portion 3 on the attaching pin. The cutting portion 2 might however take on a different conformation, such as for example a sawtooth conformation as shown in FIG. 2. In a further possible embodiment, illustrated in FIG. 3, the cutting portion 2 comprises two wire-shaped elements that are flanked and parallel.

As can be seen in FIG. 1, the attaching portion 3 can be provided with an annular edge 38, having a countersunk form, which projects from the attaching portion 3 and surrounds at least a tract of the cutting portion 2 in proximity of an attaching section 37 of the cutting portion 2 to the attaching portion 3. The annular edge 38 preferably exhibits a bell shape, with a curved internal profile. The presence of the annular edge 38 enables overall a limiting of the transversal flexion of the cutting portion 2, in particular on the rotation plane of the cutting portion 2, such as to contain the flexional stresses at the attaching section 37 of the cutting portion 2. This enables a considerable increase in the resistance and duration of the cutting portion.

The cutting element of the present invention offers important advantages.

It can be mounted and demounted simply and rapidly without any need for removing any component of the rotating head of the hedge trimmer. Though being simple and rapid to mount and demount, the cutting element provides a safe engagement to the head of the hedge trimmer, greatly reducing the risks of disengaging during rotation of the head. The cutting head further provides a very high cutting effectiveness, even in the presence of vegetation of a certain hardness and consistency.

The invention claimed is:

1. A cutting element for a hedge trimmer, comprising:
a cutting portion (2) having a cutting edge;
an attaching portion (3), associated to the cutting portion (2) and predisposed to enable attachment of the cutting element to a rotating head (10) of a hedge-trimmer;
wherein the attaching portion (3) is hook-shaped and comprises an eyelet (31) defining a housing seating (32);
wherein an attaching pin (12) of the rotary head is receivable in the housing seating, the housing seating (32) being provided with an opening (33) having a maximum width which is smaller than a diameter of the attaching pin (12), elastic means being an integral part of the eyelet to enable the opening (33) of the housing seating (32) to broaden up to taking on a width which is equal to the diameter of the attaching pin (12);
wherein the attaching portion (3) further comprises an attaching section (37) including a countersunk having a closed end and an annular edge (38) defining an open end, the attaching section (37) surrounding at least a tract of the cutting portion (2) in proximity of where the cutting portion (2) attaches to the attaching portion (3), the countersunk internally having a bell shape which broadens out from the closed end to the annular edge (38), the internal shape of the countersunk being effective (a) to limit a transversal flexion of the cutting portion (2) and (b) to limit the flexional stresses at the attaching section (37) of the cutting portion (2).

2. The cutting element of claim 1, wherein the elastic means are constituted by the eyelet (31) which on application of a force can elastically deform and thus enable a broadening of the opening (33) of the housing seating (32).

3. The cutting element of claim 1, wherein the elastic means are defined by an elastic element (35), conformed such as to narrow the width of the opening (33) of the housing seating (32) and such as to be able to deform, on application of a force, enabling a broadening of the opening (33).

4. The cutting element of claim 1, wherein the opening (33) of the housing seating (32) is interconnected to an entry passage (34) which exhibits a maximum width which is greater than a diameter of the attaching pin (12) and which opens on a lateral surface of the attaching portion (3).

5. The cutting element of claim 4, wherein the entry passage (34) is curved over an arc of about 90°.

6. The cutting element of claim 1, wherein the housing seating (32) at least in part exhibits a circular shape.

7. The cutting element of claim 1, wherein the cutting portion (2) comprises a plurality of rounded lobes (21) which project from opposite sides of the cutting portion (2).

8. The cutting element of claim 1, the cutting portion (2), in use, having a plane of rotation, wherein the countersunk is effective to limit the transversal flexion of the cutting portion (2) in the plane of rotation of the cutting portion (2).

9. The cutting element of claim 1, wherein the cutting portion is fixed to the closed end of the countersunk.

10. A cutting head for a hedge trimmer, comprising:
a support body (13, 14) predisposed to be activated in rotation about a main axis (X);
at least an attaching pin (12), solidly constrained to the support body (13, 14); and
a cutting element, the cutting element comprising:
a cutting portion (2) having a cutting edge;
an attaching portion (3), associated to the cutting portion (2) and predisposed to enable attachment of the cutting element to a rotating head (10) of a hedge-trimmer;

wherein the attaching portion (3) is hook-shaped and comprises an eyelet (31) defining a housing seating (32);

wherein the attaching pin (12) is received in the housing seating, the housing seating (32) being provided with an opening (33) having a maximum width which is smaller than a diameter of the attaching pin (12), elastic means being an integral part of the eyelet to enable the opening (33) of the housing seating (32) to broaden up to taking on a width which is equal to the diameter of the attaching pin (12);

wherein the attaching portion (3) further comprises an attaching section (37) including a countersunk having a closed end and an annular edge (38) defining an open end, the attaching section (37) surrounding at least a tract of the cutting portion (2) in proximity of where the cutting portion (2) attaches to the attaching portion (3), the countersunk internally having a bell shape which broadens out from the closed end to the annular edge (38), the internal shape of the countersunk being effective (a) to limit a transversal flexion of the cutting portion (2) and (b) to limit the flexional stresses at the attaching section (37) of the cutting portion (2).

11. The cutting head of claim 10, comprising at least two attaching pins (12), arranged in diametrically opposite positions with respect to the main axis (X), and at least two cutting elements (2, 3) associated to the attaching pins (12).

* * * * *